United States Patent [19]

Maes et al.

[11] Patent Number: 4,753,591
[45] Date of Patent: Jun. 28, 1988

[54] APPARATUS FOR FORMING THE NECK FINISH OF BLOW MOLDED CONTAINERS

[75] Inventors: Paul Maes, Grimbergen; Neil A. MacGilp, Waterloo, both of Belgium; Eric W. Meyer, Cincinnati, Ohio

[73] Assignee: The Procter & Gamble Company, Cincinnati, Ohio

[21] Appl. No.: 891,505

[22] Filed: Jul. 29, 1986

[30] Foreign Application Priority Data

Aug. 1, 1985 [GB] United Kingdom ............... 8519361

[51] Int. Cl.[4] ............................................. B29C 49/50
[52] U.S. Cl. .................................... 425/525; 264/533; 264/536; 425/527; 425/531; 425/535
[58] Field of Search ............... 264/533, 536; 425/525, 425/527, 531, 535

[56] References Cited
U.S. PATENT DOCUMENTS

| | | | |
|---|---|---|---|
| 3,314,106 | 4/1967 | Latreille et al. | 425/525 |
| 3,338,997 | 8/1967 | Tigner | 264/89 |
| 3,487,501 | 1/1970 | Siard et al. | 425/525 |
| 3,510,913 | 5/1970 | Edwards | 425/529 |
| 3,741,553 | 6/1973 | Moore | 432/11 |
| 4,382,769 | 5/1983 | Younkin et al. | 425/525 |
| 4,390,338 | 6/1983 | Bowers et al. | 425/525 |
| 4,397,629 | 8/1983 | Akutsu et al. | 425/525 |
| 4,578,028 | 3/1986 | Dirksing et al. | 425/525 |

Primary Examiner—Jay H. Woo
Assistant Examiner—Timothy W. Heitbrink
Attorney, Agent, or Firm—R. C. Witte; T. H. O'Flaherty; J. V. Gorman

[57] ABSTRACT

An improved cutting sleeve for the removal of flash from thermoplastic containers is disclosed. When used in conjunction with a blow-pin the cutting sleeve is movable relative to the blow-pin. In a preferred embodiment the cutting sleeve comprises two portions of different diameter. Use of the cutting sleeve results in an improved finish of the container neck.

3 Claims, 1 Drawing Sheet

U.S. Patent   Jun. 28, 1988   4,753,591
Fig. 1
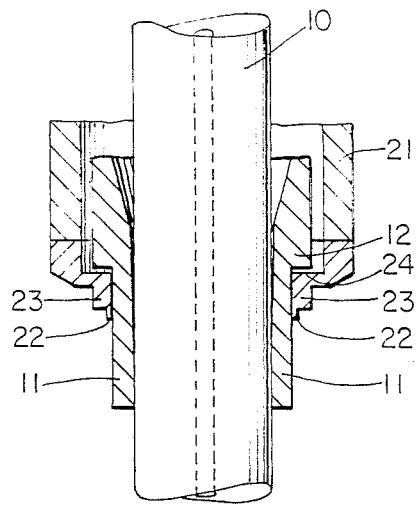
Fig. 2 PRIOR ART
Fig. 3
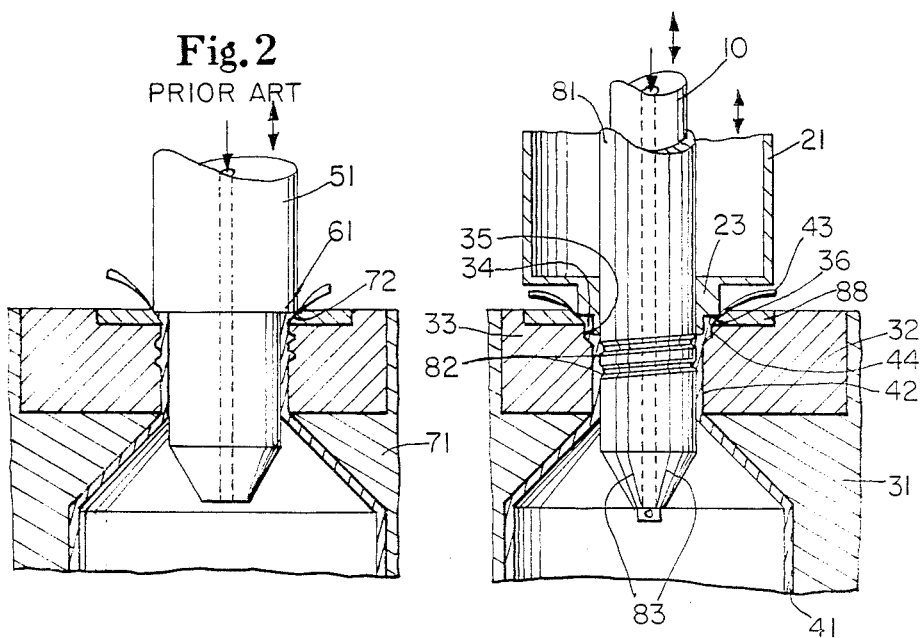

APPARATUS FOR FORMING THE NECK FINISH OF BLOW MOLDED CONTAINERS

TECHNICAL FIELD

This invention relates to an apparatus for use in forming the neck finish of blow molded containers, and the process using the apparatus.

Typically, a blow molded container, for example a bottle of thermoplastic material, is formed on either a blow-pin machine or on a blow-needle machine. In the former type, a hot parison of thermoplastic material is introduced into a female mold having the shape of the bottle to be formed. Generally, this shape comprises a body portion and a neck portion. The parison-end in the neck portion remains open. A blow-pin is introduced into the open end of the parison. Via the blow-pin air pressure is applied to the interior of the parison, thus forcing the parison into the shape of the mold.

Removal of excess thermoplastic material at the neck of the just formed bottle (the so-called "flash") is effected by cutting-off the flash with a cutting sleeve. This sleeve is typically a ring of diameter slightly larger than the blow-pin and mounted coaxially affixed to the blow-pin, and which is forced against a striker plate affixed to the mold area surrounding the neck portion of the bottle. Hence, the flash is cut-off by shear action between the sleeve and the mold.

The blowing process in a blow-needle machine is different in that the mold, through its design, closes the parison at both ends. A blow-needle is then inserted in the portion of the parison extending beyond the actual neck portion of the mold. After the bottle is blown, the needle is removed and the bottle is released from the mold. Subsequently, the flash is cut-off in a post-molding operation, and trimmed, e.g., by a rotating knife.

The flash removal cutting sleeve of the blow-pin machine leaves a different finish on the bottle neck than the finish formed by the cutting operation on the blow-needle machine. Both types of finish leave much to be desired. As a result of poor neck finish, flow-molded bottles have a relatively high incidence of leakage. Frequently, gaskets have to be used to prevent such leakage; this adds to the cost of manufacture and filling of blow-molded containers.

Expandable blow-pins have been suggested for use in the manufacture of blow-molded containers having internal attachment means. By their nature, these blow-pins are less rigid than the more conventional types. It has now been found that conventional cutting sleeves do not give a satisfactory finish when used in conjunction with expandable blow-pins.

It is therefore an object of the present invention to provide a cutting-sleeve for use in a blow-molding operation, designed to give an improved finish of blow molded containers.

It is a further object of this invention to provide a cutting sleeve for use in conjunction with an expandable neck-forming die.

SUMMARY OF THE INVENTION

The present invention relates to a cutting sleeve for use in a neck-forming step of a process for making a thermoplastic container.

The cutting sleeve may be used in conjunction with a blow-pin, or separate from the blow-molding operation in a post-forming operation. When used in conjunction with a blow-pin, the cutting sleeve may be affixed to the blow-pin or movable, relative to the blow-pin, in the direction of the axis of the blow-pin.

Cutting sleeves which are affixed to a blow-pin must be shaped. As used herein in the description of a cutting sleeve, the work "shaped" means comprising at least two distinct cylindrical portions of different diameter.

Cutting sleeves which are used in conjunction with a blow-pin and which are movable relative to that blow-pin may or may not be shaped, but shaped cutting sleeves are preferred.

The invention encompasses methods of blow molding or post forming which make use of the cutting sleeve described herein.

BRIEF DESCRIPTION OF THE DRAWINGS

FIG. 1 is a vertical cross-sectional view of a cutting sleeve assembly showing a portion of a blow-pin surrounded by a cutting sleeve.

FIG. 2 is a vertical cross-sectional view of a prior art blow-pin having a conventional cutting sleeve affixed thereto.

FIG. 3 is a vertical cross-sectional view of a cutting sleeve assembly comprising an expandable blow-pin assembly surrounded by a shaped cutting sleeve.

DETAILED DESCRIPTION OF THE INVENTION

The cutting sleeve of the present invention is intended for use in the manufacture of blow-molded containers. Such containers typically comprise a body portion and a neck portion. Blow-molded containers are formed from a thermoplastic parison of a higher weight than the finished container. The parison is typically placed between two halves of a female mold. The mold halves are designed in such a way that the excess thermoplastic at one end of the parison is cut-off when the two mold halves close around the parison. The bottom seal of the container is formed at this point in time.

The container is then formed by applying air pressure to the interior of the parison, thus forcing the parison against the inner walls of the mold. Depending on the type of machine, the air enters the parison via a blow-pin which is inserted in the neck portion of the parison, or via a blow needle which is inserted in the portion of the parison which extends beyond the neck portion (i.e., in the portion of the parison which subsequently will be removed as "flash").

The cutting sleeve operates while the neck of the container is being held within a support collar. When a blow-pin machine is used, this support collar can be simply the neck portion of the mold. When a blow-needle machine is used, the container must first be removed from the mold and some of the flash removed, so as to form an open end, prior to operating the cutting sleeve.

Prior art cutting sleeves designed for use in conjunction with a blow pin (i.e., on a blow-pin machine) are affixed to the blow pin. It has been discovered that an improved finish of the neck of the thermoplastic container may be obtained by using a cutting sleeve which is movable relative to the blow-pin.

One aspect of the present invention is therefore a cutting sleeve assembly for use in the blow-molding of thermoplastic containers, comprising a cylindrical cutting sleeve and a blow-pin, wherein the cutting sleeve surrounds the blow-pin and is movable, relative to the blow-pin, in the direction of the axis of the blow-pin.

In certain blow-molding processes it is desirable to use blow-pins which are radially expandable. Radially expandable blow pins are, for example, useful in the manufacture of thermoplastic bottles which have internal attachment means in their neck portion. It has now been found that if a cutting sleeve is to be operated in conjunction with a radially expandable blow-pin the cutting sleeve should not be affixed to the blow pin. A specific embodiment of the present invention is, therefore, a cutting sleeve assembly comprising a radially expandable blow-pin surrounded by a cutting sleeve which is movable, relative to the blow pin, in the direction of the blow-pin axis. Specifically preferred are cutting sleeve assemblies comprising a radially expandable blow-pin which has relieved areas formed on its exterior surfaces.

A second aspect of this invention is a shaped cutting sleeve. The term "shaped cutting sleeve" as used herein denotes a cutting sleeve comprising at least two distinct cylindrical portions of different diameter. It should be noted that the length of such a cylindrical portion may be infinitesimally small. Hence, a conical cutting sleeve is a shaped cutting sleeve within the present definition, as two cylinder portions of different diameter can be identified in a cone, be it that both cylindrical portions are of infinitesimal length. Conical cutting sleeves are, however less preferred for the purpose of the present invention. Specifically included are also cutting sleeves having a first cylindrical portion of a finite length, and a conical portion, in particular cutting sleeves wherein the conical portion has a smallest diameter at least equal to the diameter of the first cylindrical portion.

Shaped cutting sleeves wherein both cylindrical portions have a finite length are preferred.

In its simplest form, the shaped cutting sleeve of this invention is a ring having a first cylindrical portion of diameter $d_1$ and a second cylindrical portion of diameter $d_2$, whereby $d_2 > d_1$; $d_1$ is slightly greater than the internal diameter (before finishing) of the container neck, $d_n$.

The cutting sleeve is operated by introducing cylindrical portion with diameter $d_1$ into the neck portion of the container, and lowering the sleeve until cylindrical portion having diameter $d_2$ touches the support collar around the neck of the container. The flash is cut-off by shear action at the circle of contact of the cutting sleeve and the collar. At the same time, sleeve portion of diameter $d_1$ exerts an outwardly radial pressure on the upper neck portion of the container. This results in an unusually smooth finish of the circumference of the container neck.

The invention is illustrated in the drawings and the accompanying description. The drawings show a particular embodiment of the invention; they are not intended to limit the scope of the invention, but merely to illustrate its principle.

FIG. 1 is a vertical cross-sectional view of a cutting sleeve assembly showing a portion of a blow-pin surrounded by a cutting sleeve.

The blow-pin assembly comprises blow pin 10 and expandable core members 11. The blow-pin is attached to a blow-pin machine by an attachment means (not shown) permitting vertical movement of the assembly.

The cutting sleeve 21 comprises a lower cylindrical portion 22, having diameter $d_1$, and a second cylindrical portion 23, having diameter $d_2$; $d_2 > d_1$. The cutting sleeve is attached to a blow-pin machine by an attachment means (not shown) permitting vertical movement of the sleeve, both in absolute and relative to the blow-pin assembly.

In FIG. 3, a blow-pin assembly is depicted inserted in neck portion 32 of mold 31. The assembly presses the neck portion 42 of parison 41 against the inner wall of neck portion 32 of the mold 31. The upper part of the neck portion of mold 31 forms support collar 33. Support collar 33 has a cavity 34, comprising a cylindrical portion 35 having diameter $d_3$, and a tapered portion 36 having a smallest diameter $d_3$ and a greatest diameter $d_4$, such that $d_1 < d_3 < d_2 < d_4$.

The blow-pin assembly and cutting sleeve are operated as follows. First, parison, 41 is introduced into mold 31, as in standard blow molding practice. Then the blow-pin is lowered into the neck portion of the mold. Air pressure entering the mold cavity via blow pin 10 forms the parison into the required shape.

Before the blow molded container is formed, the cutting sleeve is lowered. As the neck portion of the container is already formed, it is important that the cutting sleeve can be lowered while the neck forming die remains in position. The sleeve is forced downward until cylindrical portion 23 of the sleeve reaches tapered portion 36 of collar 33. At the touching point of sleeve portion 23 and collar portion 33, the parison is squeezed to a thickness of less than 0.1 mm. The flash 43, i.e. the portion of the parison extending beyond the cutting point of sleeve 21 and collar 33, can subsequently be removed in standard fashion. In an alternate embodiment, the collar is cylindrical, having diameter $d_3$, and the cutting sleeve has a tapered portion having a smallest diameter $d_2$ and a largest diameter $d_4$, such that $d_1 < d_2 < d_3 < d_4$.

During operation of the cutting sleeve, cylindrical portion 22 of the sleeve forces the upper circumference 44 of neck portion 42 of parison 41 against cylindrical portion 35 of cavity 34 of collar 33, thereby compressing the thermoplastic material at circumference 44 of the parison. It has been found that this compression results in a highly desirable smooth finish of circumference 44. The smooth finish facilitates a liquid tight seal of the blow molded container.

The above description relates to the use of the cutting sleeve in the blow molding process of a blow-pin machine. The sleeve may also be used to provide a smooth finish on the circumference of a container formed on a blow needle machine. In this case, the container is formed in the blow needle machine in standard fashion. Subsequently, the formed container is removed from the mold, and some of the flash is removed so as to create an open end (e.g., by cutting of the top portion of the flash with a knife). While the upper neck portion of the container is supported by a collar, the collar having e.g. the tapered design as described hereinabove, the cutting sleeve is inserted into the opening of the container, and lowered until it touchingly engages the tapered portion of the collar.

It will be in general be necessary to either carry out this post-forming cutting operation immediately after the blow molding process, while the container is still hot, or to reheat the neck portion of the container.

The present cutting sleeve is particularly suitable for use in conjunction with an expandable blow-pin. Such a blow-pin may be constructed by converting a collapsible core of the type used in injection molding of, e.g., bottle caps.

In general, these collapsible cores comprise of segments, and radial expansion involves radial movement of the segments. In the expanded state the core surface is continuous, be it interrupted by segment lines. These segment lines leaves marks on the interior surface of the container neck when the core is used as an expandable blow-pin in the blow-molding of thermoplastic containers. This causes the container to have a poor finish and, consequently, be prone to leakage. It has now been discovered that with the shaped cutting sleeve of the present invention it is possible to obtain an excellent finish on containers made by a process using an expandable blow-pin.

Typically, expandable blow-pins are used when a relief is to be formed at the internal surface of the container neck. An example of such a relief is an internal attachments means, e.g. screw threads. Hence, it is not possible to move the expandable segments further downward after the container has been formed.

It is therefore impossible to use a downward movement of the expandable segments to activate the cutting sleeve. For use in conjunction with an expandable blow-pin having a relief on its outer surface it is therefore mandatory that the cutting sleeve be movable relative to the blow-pin assembly.

FIG. 2 shows a conventional blow-pin and a conventional cutting sleeve in operation.

FIG. 3 depicts the cutting sleeve of the present invention, used in conjunction with an expandable blow-pin.

In FIG. 2, after forming of the container, blow pin 51 is moved downwardly until cutting sleeve 61 touches tapered portions 72 of mold 71. During this movement the blow-pin slides along the internal surface of the neck of the container.

In FIG. 3, after the internal attachment means has been formed, no further downward movement of expandable blow-pin 81 is possible without damaging the newly formed screw threads 82. Segment lines 83 have formed marks on the internal surface of neck portion 42. Cutting sleeve 21 is operated by moving it downwardly while expandable segments 81 remain in the same position. The cutting sleeve is moved downwardly until its upper cylindrical portion 23 touches tapered portion 36 of striker plate 88. In the upper portion of neck portion 42, cylindrical portion 35 of cutting sleeve 21 forces thermoplastic material radially outwardly. Hence, segment line marks are erased. The compression of thermoplastic material results in a smooth finish of the upper inner portion of the container neck. Subsequently, the container body is formed by introducing air pressure via blow-pin 10.

We claim:

1. A cutting sleeve for an expandable blow pin of a blow molding machine wherein thermoplastic materials are formed into a container within the cavity of a mold, said cutting sleeve comprising a cylindrical body having an axial passageway therein adapted to be telescoped onto the blow pin and mounted for reciprocating axial movement thereon, said cylindrical body having cutting means on its lower end adapted to coact with corresponding means on the mold to separate flash from the container neck along a circular severance line, and a lower cylindrical portion located radially inwardly of said cutting means and being adapted to enter the neck of said container when the cutting sleeve is moved into cutting position and thereby produce a smooth interior surface of the container neck by compressing the thermoplastic material.

2. A cutting sleeve for a blow pin of a blow molding machine, said cutting sleeve comprising a cylindrical body having an axial passageway therein adapted to be telescoped onto the blow pin and mounted for reciprocating axial movement thereon, said cylindrical body having a corner at its lower end adapted to serve as a circular cutting edge and a lower cylindrical portion spaced radially inwardly of the corner and being adapted to enter the neck of a container being formed in the blow molding machine when the cutting sleeve is moved into cutting position and thereby produce a smooth interior surface of the container neck by compressing the thermoplastic material.

3. A cutting sleeve for a blow pin of a blow molding machine, said cutting sleeve comprising a cylindrical body having an axial passageway therein adapted to be telescoped onto the blow pin and mounted for reciprocating axial movement thereon, said cylindrical body having a tapered portion at its lower end adapted to serve as a circular cutting surface and a lower cylindrical portion spaced radially inwardly of the tapered portion and being adapted to enter the neck of a container being formed in the blow molding machine when the cutting sleeve is moved into cutting position and thereby produce a smooth interior surface of the container neck by compressing the thermoplastic material.

* * * * *